July 15, 1958

A. J. BUCHI 2,843,311

COUPLING DEVICES

Filed Nov. 14, 1955

2 Sheets-Sheet 1

INVENTOR
ALFRED J. BUCHI

BY Wenderoth, Lind & Ponack
Attys.

July 15, 1958     A. J. BUCHI     2,843,311
COUPLING DEVICES

Filed Nov. 14, 1955     2 Sheets-Sheet 2

INVENTOR
ALFRED J. BUCHI

# United States Patent Office 2,843,311
Patented July 15, 1958

2,843,311

COUPLING DEVICES

Alfred J. Buchi, Winterthur, Switzerland

Application November 14, 1955, Serial No. 546,671

Claims priority, application Switzerland
November 27, 1954

7 Claims. (Cl. 230—116)

This invention concerns coupling devices for an assembly comprising a turbine and a compressor rotor whereby the rotors are coupled together and to a shaft by which the assembly is supported for rotation.

According to this invention the turbine rotor is located against radial movement by a hollow shaft and the coupling device comprises a tie member carried by the turbine rotor and extending through the shaft and means bearing against the shaft for tensioning the tie member, the shaft passing through the compressor rotor, the arrangement being that when the tie member is tensioned the hubs of the pair of rotors are drawn together and thereby coupled and the compressor rotor is drawn against, and coupled to, the shaft.

To reduce the transfer of heat from the turbine to the compressor rotor it is preferred, according to a feature of this invention, that the next adjacent faces of the rotors are provided with annular, axial ribs which are clamped together when the tie member is tensioned. This construction provides a space between the next adjacent faces of the rotors and the space may be packed with heat insulating material further to reduce transfer of heat.

Figures 1, 2, 3:
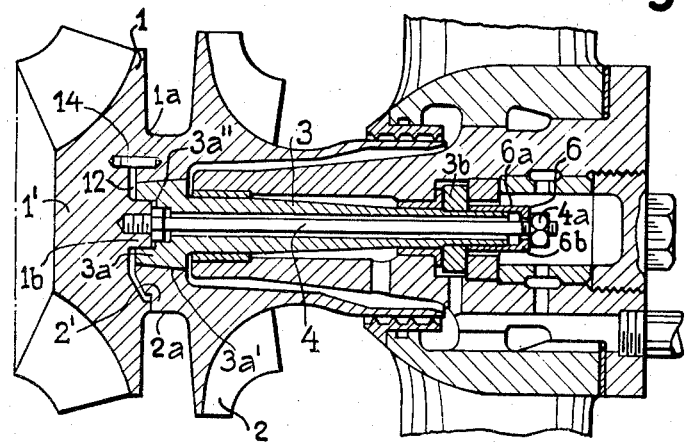

Practical applications of this invention will now be described, by way of example only, with reference to the accompanying drawings of which:

Figure 1 is a sectional elevation of a coupling device according to this invention, and Figures 2 to 5 are similar views showing alternative constructions according to this invention.

Referring to Figure 1: the turbine rotor 1 and the compressor rotor 2 are secured to a hollow shaft 3. The shaft is formed with a head $3a$ by which the rotor 2 is supported as later described. The rotor 1 carries a tie member 4 which passes through the shaft 3 and mounted on the free end of the member 4 is a thimble 6 the skirt $6a$ of which receives an end of shaft 3. The skirt $6a$ abuts a collar $3b$ mounted on shaft 3 and engaging a part of a bearing assembly from which the shaft is supported. A nut $4a$ is on member 4 and engages the end of the thimble so that when the nut is tightened up the member 4 is tensioned and the rotors 1 and 2 are drawn together so that the hubs of the rotors are coupled together. The hubs of the rotors are provided on their next adjacent faces with annular, axial ribs $1a$ and $2a$ respectively which are clamped together when the tie member is tensioned. By thus providing annular ribs a space is formed between the hubs so that heat transfer from the turbine to the compressor is reduced. The space may be packed with heat insulating material 12 further to reduce heat transfer.

The head $3a$ of shaft 3 has a tapering surface $3a'$ which enters a correspondingly tapering surface of rotor 2. The rotor 1 has a central nave $1b$ which closely fits the head $3a$ whereby the rotor 1 is located against radial movement. Consequently the rotors are co-axially positioned on the shaft 3.

As seen in Figure 1 the tie member 4 is screw threaded into the nave $1b$ of rotor 1.

In Figure 2 the tie member 4 passes through the hub $1'$ of the turbine rotor 1 and is formed with a head which abuts the rotor hub.

Figure 3 shows the shaft 3 formed with a head $3d$ having a tapering portion $3d''$ and a cylindrical portion $3d'$ next to the rotor. The hub of rotor 2 is correspondingly formed. The cylindrical portion may be further from the rotor 1 than the tapering portion, the rotor 2 being similarly formed. The cylindrical parts of head $3d$ and rotor 2 are keyed together as shown.

The rotor 2 is co-axially mounted on shaft 3 and the rotors in turn are co-axially located by a spigot point whereof annular flange $1c$ is accurately received in a spigot $2c$ on rotor 2. The space between the rotor hubs is packed with heat insulating material $12'$ which extends inwardly to the tie member 4.

Figure 4:
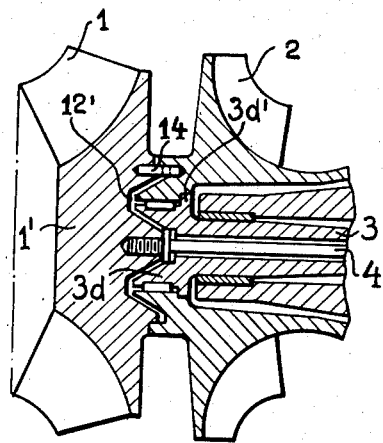

In Figure 4 the shaft 3 has a head comprising a cylindrical portion $3d$ and an outwardly-directed annular flange $3d'$ against which the rotor 2 is drawn, the rotor being co-axially mounted, and keyed to, the portion $3d$. The rotor 1 is co-axially located on rotor 2 by a spigot joint as described above with reference to Figure 3.

Figure 5:
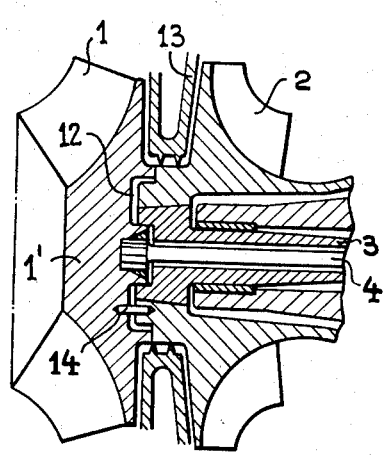

The construction of Figure 5 is similar to that of Figure 1 wherein however the end of the tie member 4 enters hub $1'$ of rotor 1 and is secured thereto by welding. The member 4 could extend completely through hub $1'$ and be united thereto by electric welding. Such an arrangement avoids weakening of the rotor 1 as occurs with the arrangement of Figure 2.

The casing within which the assembly of rotors is mounted is shown in Figure 5 at 13, this being the part of the casing which is located between the rotors. With the devices described the part 13 may be made in one piece, the rotors being arranged separately on opposite sides of the part 13 and thereafter coupled together by the devices.

Further to prevent relative rotation of the rotors they may be additionally coupled together by pins, keys, studs or the like. In Figures 1, 3 and 4 coupling pins are indicated at 14.

I claim:

1. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said annular shoulder defining a free disk like space between the turbine rotor disk and the thereto opposed faces of the blower hub portion and said connection piece, said space extending from said annular shoulder to said prolongation on the turbine disk.

2. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said rotational connection comprising at least one pin passing radially inwardly of said annular shoulder on the turbine disk connecting the turbine rotor disk rotationally to said hub portion of the blower rotor.

3. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said turbine rotor disk between said annular shoulder and said prolongation on the turbine disk forming a zig-zag line as seen in axial section spaced from a similar line on the thereto opposed portion of said hub and said connecting piece.

4. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said means to firmly secure the blower rotor to said central piece comprising a tapered hole in the compressor rotor and said central piece being tapered, the tapering surfaces being drawn together when the prolongation on the turbine disk is tensioned against said hollow shaft.

5. A device as claimed in claim 4 wherein the rotor hole and the shaft portion taper for only a part of the axial extent of said hole.

6. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said centering means of the turbine rotor comprising a recessed annular surface on said prolongation of the turbine disk fitted within a recessed annular space of the hollow shaft.

7. Overhung supported turbo-blower rotor, comprising a separate turbine rotor for a hot actuating medium and a blower rotor for a relatively cool pressure medium and a common rotary hollow shaft rotating with said rotors, the blower rotor having a central integral hub portion protruding from the rear side of said blower, a central prolongation on the turbine disk passing through the hollow shaft and screw means associated therewith to clamp the turbine rotor disk to said hub portion, a stationary bearing for said common rotary shaft, said bearing extending axially partially into the hub portion of said blower rotor, said shaft having beyond said stationary bearing a central connecting piece for both said rotors, means for rotational connection of both rotors, means to firmly secure the blower rotor to said central connecting piece at tensioning of said screw means associated with said central prolongation on the turbine rotor, an annular shoulder on said turbine disk projecting axially against said blower hub portion, and centering means to center the turbine rotor with said hollow shaft, said means to firmly secure the blower rotor to said central piece comprising a cylindrical hole in the compressor rotor, and said connecting piece being cylindrical and having an outwardly-directed annular flange against which the blower rotor is drawn.

References Cited in the file of this patent

UNITED STATES PATENTS

| | | |
|---|---|---|
| 2,322,824 | Buchi | June 29, 1943 |
| 2,577,134 | Land | Dec. 4, 1951 |

FOREIGN PATENTS

| | | |
|---|---|---|
| 990,231 | France | Sept. 19, 1951 |